(12) United States Patent
Osaka

(10) Patent No.: US 11,660,746 B2
(45) Date of Patent: May 30, 2023

(54) SEPARATE MOVING AND POSITIONING MODES FOR A ROBOT, METHOD PROVIDING SEPARATE MOVING AND POSITIONING MODES FOR THE ROBOT, METHOD OF MANUFACTURING A PRODUCT, AND A RECORDING MEDIUM

(71) Applicant: CANON KABUSHIKI KAISHA, Tokyo (JP)

(72) Inventor: Tsutomu Osaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 435 days.

(21) Appl. No.: 16/809,708

(22) Filed: Mar. 5, 2020

(65) Prior Publication Data

US 2020/0283242 A1  Sep. 10, 2020

(30) Foreign Application Priority Data

Mar. 8, 2019  (JP) .............................. JP2019-042675

(51) Int. Cl.
*B25J 9/16* (2006.01)
*G05B 19/404* (2006.01)
(Continued)

(52) U.S. Cl.
CPC ........... *B25J 9/1633* (2013.01); *B25J 9/1664* (2013.01); *B65G 47/905* (2013.01); *F16H 1/20* (2013.01);
(Continued)

(58) Field of Classification Search
CPC ..... B25J 9/1633; B25J 9/1664; B65G 47/905; F16H 1/20; F16H 1/22; G05B 19/404; G05B 2219/41034
See application file for complete search history.

(56) References Cited

U.S. PATENT DOCUMENTS 10,228,054 B1 * 3/2019 Wittig ..................... F16H 57/12
2002/0025722 A1   2/2002 Inagawa et al.
(Continued)

FOREIGN PATENT DOCUMENTS

JP   S47-24481 U   11/1972
JP   S6-38473 A    1/1988
(Continued)

OTHER PUBLICATIONS

Jan. 31, 2023 Office Action in Japanese Patent Application No. 2019-042675 (with English translation).

*Primary Examiner* — Ian Jen
*Assistant Examiner* — Karston G. Evans
(74) *Attorney, Agent, or Firm* — Venable LLP

(57) ABSTRACT

A robot includes a first driving source, a second driving source, an output portion to which both rotation of the first driving source and rotation of the second driving source are transmitted, and a control device configured to execute a first process and a second process. In the first process, the control device controls the first driving source and the second driving source such that when the output portion is rotated toward a predetermined direction, a rotational direction of the output portion is limited to the predetermined direction. In the second process, the control device controls the first driving source and the second driving source such that when the output portion is rotated toward a predetermined direction, the output portion is able to rotate toward a direction opposite to the predetermined direction.

17 Claims, 10 Drawing Sheets

(51) Int. Cl.
 *B65G 47/90* (2006.01)
 *F16H 1/20* (2006.01)
 *F16H 1/22* (2006.01)

(52) U.S. Cl.
 CPC .............. *F16H 1/22* (2013.01); *G05B 19/404* (2013.01); *G05B 2219/41034* (2013.01)

(56) References Cited

U.S. PATENT DOCUMENTS

| | | |
|---|---|---|
| 2003/0104728 A1 | 6/2003 | Inagawa et al. |
| 2008/0150454 A1 | 6/2008 | Ito et al. |
| 2009/0237026 A1* | 9/2009 | Panaitescu ........... G05B 19/404 |
| | | 318/630 |
| 2011/0204838 A1 | 8/2011 | Nakasugi |
| 2014/0025197 A1* | 1/2014 | Mattern .................. B25J 13/08 |
| | | 700/218 |
| 2014/0084840 A1 | 3/2014 | Osaka |
| 2014/0107837 A1* | 4/2014 | Tsai ...................... H02K 7/116 |
| | | 700/245 |
| 2014/0379128 A1 | 12/2014 | Ishikawa et al. |
| 2015/0165620 A1* | 6/2015 | Osaka .................... B25J 13/088 |
| | | 700/250 |
| 2016/0223060 A1 | 8/2016 | Yasui |
| 2017/0015004 A1 | 1/2017 | Osaka et al. |
| 2017/0036356 A1 | 2/2017 | Christiansen |
| 2017/0239817 A1* | 8/2017 | Kawase ................. B25J 13/085 |
| 2018/0141218 A1 | 5/2018 | Osaka |

FOREIGN PATENT DOCUMENTS

| | | |
|---|---|---|
| JP | S63-8473 A | 1/1988 |
| JP | H09-133196 A | 5/1997 |
| JP | H09-248778 A | 9/1997 |
| JP | 2007325479 A | 12/2007 |
| JP | 2011176913 A | 9/2011 |
| JP | 2016-142358 A | 8/2016 |

\* cited by examiner

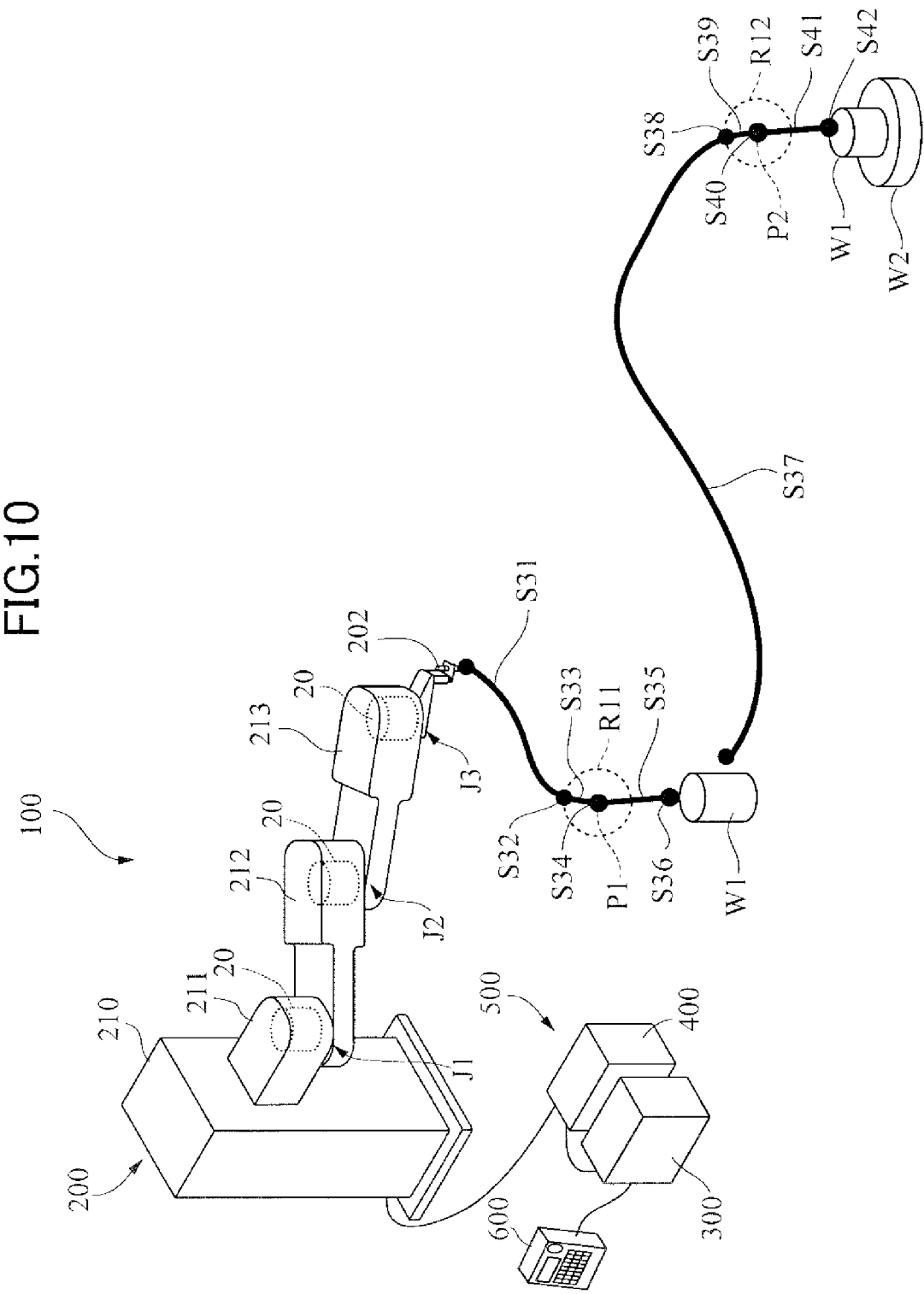

SEPARATE MOVING AND POSITIONING MODES FOR A ROBOT, METHOD PROVIDING SEPARATE MOVING AND POSITIONING MODES FOR THE ROBOT, METHOD OF MANUFACTURING A PRODUCT, AND A RECORDING MEDIUM

BACKGROUND OF THE INVENTION

Field of the Invention

The present invention relates to controlling a manipulator.

Description of the Related Art

A manipulator is used in a production line in which products are manufactured. The manipulator used in the production line is required to have high positioning accuracy or compliance depending on circumstances.

Japanese Patent Application Publication No. 2011-176913 describes a driving device that drives a joint of a manipulator. The driving device described in Japanese Patent Application Publication No. 2011-176913 has a motor, such as an AC servo motor or a brushless DC motor, and reduction gears disposed on the output side of the motor. In such a manipulator, it is known that the backlash of the reduction gears causes vibration and a positioning error of the manipulator. Thus, the technique described in Japanese Patent Application Publication No. 2011-176913 uses an encoder disposed on the output side of the reduction gears, and positions the manipulator at a predetermined position by using the full-closed loop control. In addition, the technique described in Japanese Patent Application Publication No. 2011-176913 uses another encoder disposed on the input side of the reduction gears, and moves the manipulator at high speed by using the semi-closed loop control.

By the way, the manipulator that performs precision work may also be required to have high-power torque. In addition, even when the manipulator operates with the high-power torque, the manipulator is required to change the controllability, such as the high positioning accuracy and the compliance, depending on circumstances. For example, the compliance is less required when the manipulator positions a component more precisely and in less vibration, but may be required when the manipulator inserts one component into another component, for easily inserting the component.

SUMMARY OF THE INVENTION

According to a first aspect of the present invention, a robot includes a first driving source, a second driving source, an output portion to which both rotation of the first driving source and rotation of the second driving source are transmitted, and a control device configured to execute a first process and a second process. In the first process, the control device controls the first driving source and the second driving source such that when the output portion is rotated toward a predetermined direction, a rotational direction of the output portion is limited to the predetermined direction. In the second process, the control device controls the first driving source and the second driving source such that when the output portion is rotated toward a predetermined direction, the output portion is able to rotate toward a direction opposite to the predetermined direction.

According to a second aspect of the present invention, a method of controlling a robot performed by a control device, the robot including a first driving source, a second driving source, and an output portion to which both rotation of the first driving source and rotation of the second driving source are transmitted, the method includes executing, by the control device, a first process or a second process depending on a motion of the robot to be performed. In the first process, the control device controls the first driving source and the second driving source such that when the output portion is rotated toward a predetermined direction, a rotational direction of the output portion is limited to the predetermined direction. In the second process, the control device controls the first driving source and the second driving source such that when the output portion is rotated toward a predetermined direction, the output portion is able to rotate toward a direction opposite to the predetermined direction.

Further features of the present invention will become apparent from the following description of exemplary embodiments with reference to the attached drawings.

BRIEF DESCRIPTION OF THE DRAWINGS

FIG. 10 is an explanatory diagram illustrating the method of manufacturing a product, performed by using the robot of the third embodiment.

DESCRIPTION OF THE EMBODIMENTS

Hereinafter, some embodiments of the present invention will be described in detail with reference to the accompanying drawings.

First Embodiment

Figure 1:
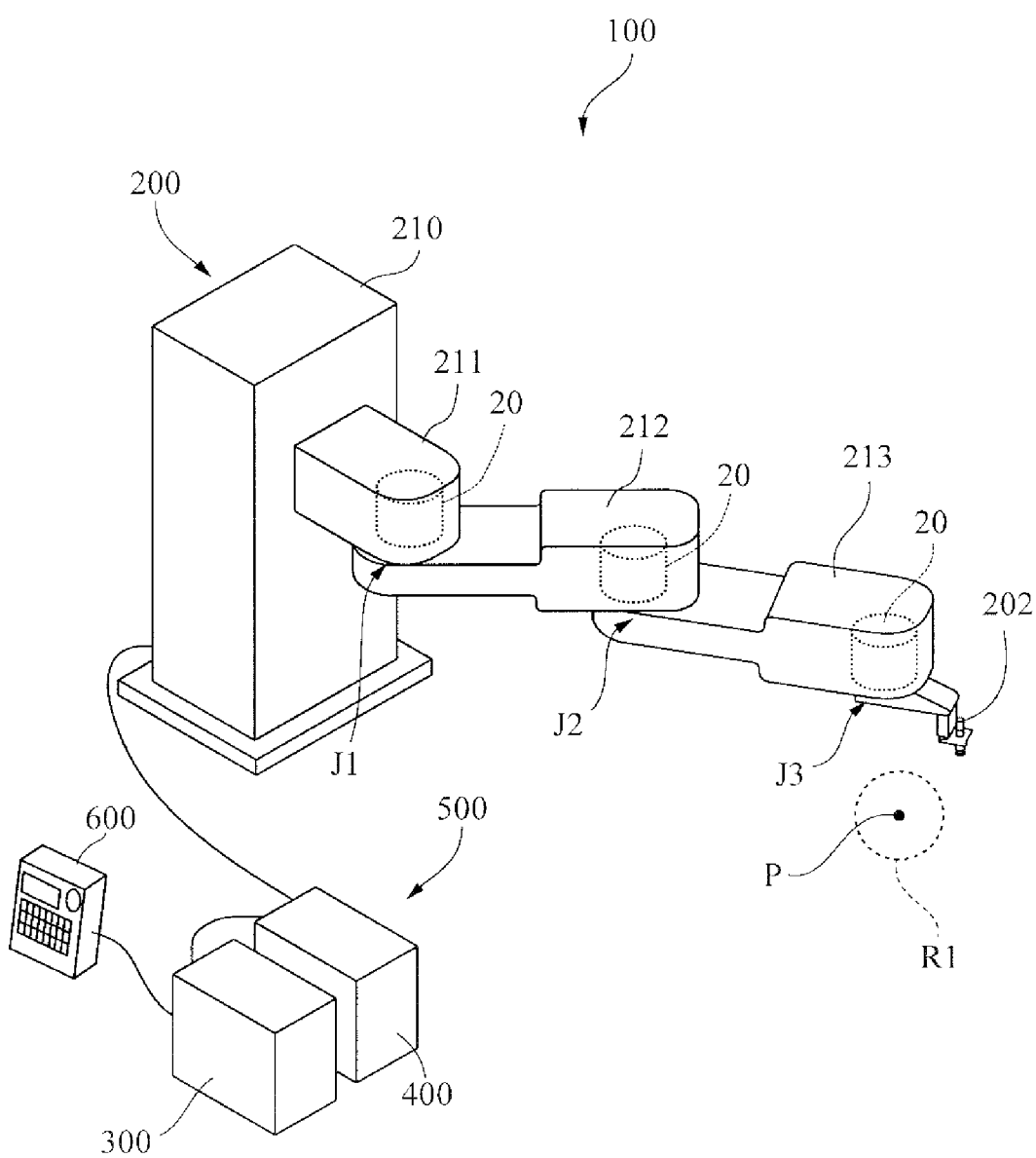
FIG. 1 is a perspective view illustrating a robot of a first embodiment.

FIG. 1 is a perspective view illustrating a robot of a first embodiment. A robot 100 illustrated in FIG. 1 is an industrial robot, which is disposed in a production line of a plant or the like and used for production work such as assembly work. The robot 100 includes a manipulator 200 and a control device 500 that controls the operation of the manipulator 200. The robot 100 also includes a teaching pendant 600, which is a teaching device used for sending teach data to the control device 500. The teaching pendant 600 is operated by an operator, and is used for specifying operations of the manipulator 200 and the control device 500.

The manipulator 200 is a horizontally articulated robot arm (SCARA). The manipulator 200 may be any manipulator as long as it has more than one joint. In the first embodiment, the manipulator 200 has a plurality of joints, three joints J1 to J3, for example. The manipulator 200 includes a base portion 210 fixed to a workbench, a link 211 fixed to the base portion 210, a link 212 linked with the link 211 via the joint J1, and a link 213 linked with the link 212 via the joint J2. In addition, the manipulator 200 includes a hand 202 linked with the link 213 via the joint J3. The hand 202 is one example of end effectors. That is, the hand 202 is a leading end portion of the manipulator 200. The hand 202 is an end effector that holds a workpiece. The hand 202 is an air suction hand in the first embodiment, but may have a plurality of fingers that can open and close.

The manipulator 200 includes a driving device 20 disposed in each of the joints J1 to J3. Each of the joints J1 to J3 of the manipulator 200 is rotated by the driving device 20, so that the leading end portion of the manipulator 200, that is, the hand 202 can move to any position in a movement range within a work space in which the manipulator 200 is disposed.

The control device 500 includes a control unit 300 that is a first control unit, and a control unit 400 that is a second control unit. The control unit 300 controls the robot 100 as a whole. The control unit 400 controls the driving device 20 of each of the joints J1 to J3 of the manipulator 200 in accordance with an instruction from the control unit 300.

Figure 2:
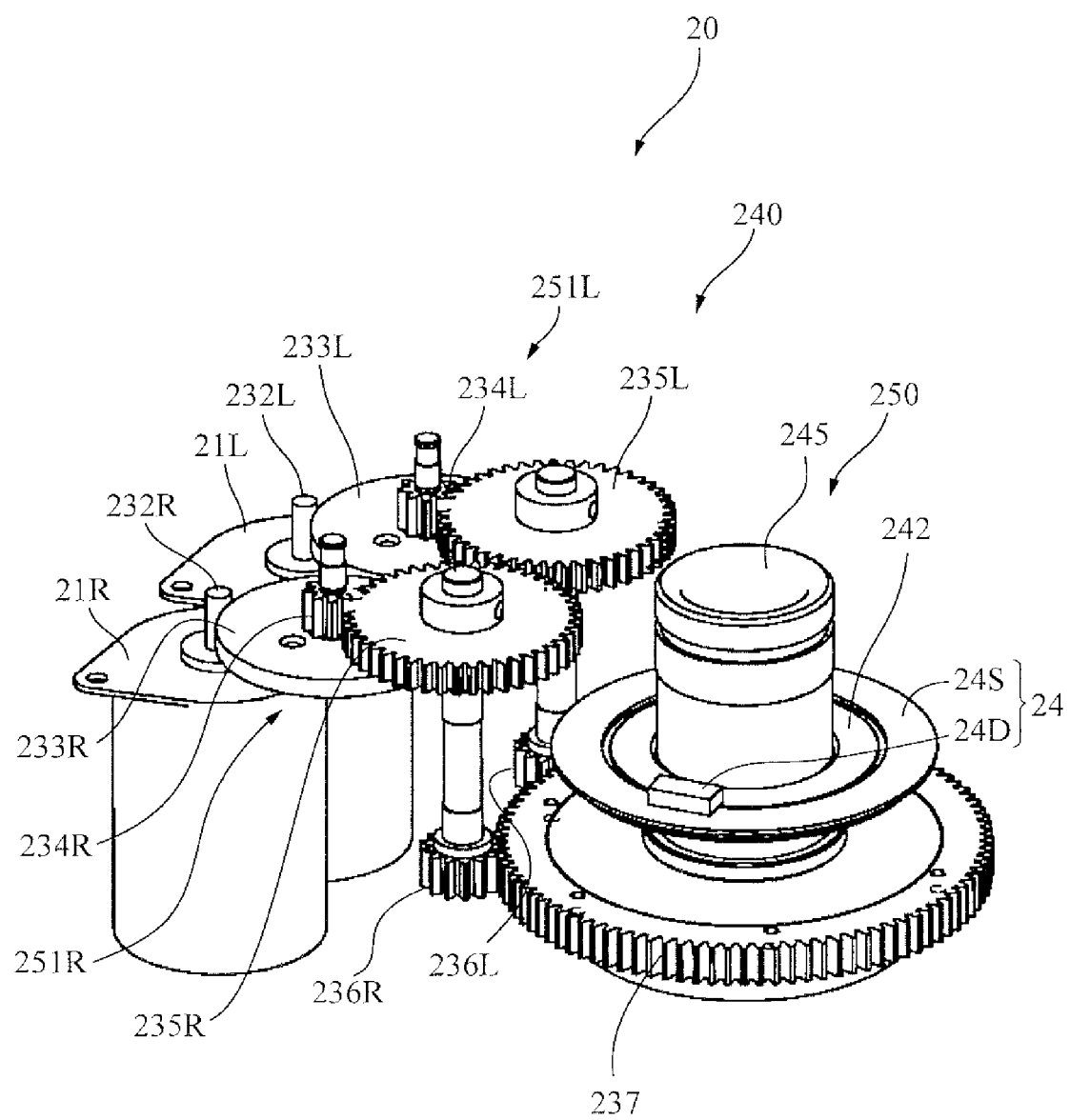
FIG. 2 is a perspective view of a driving device of the first embodiment.

FIG. 2 is a perspective view of the driving device 20 of the first embodiment. The driving device 20 includes an electric motor 21R that is one example of a first driving source, and an electric motor 21L that is one example of a second driving source. In addition, the driving device 20 includes a transmission mechanism 240, and an encoder 24 that is one example of detection units.

The transmission mechanism 240 transmits the torque generated by the motors 21R and 21L, to an output portion, i.e., an output destination, of the transmission mechanism 240. The output portion of the transmission mechanism 240 is provided with a driven member, such as the link 212, the link 213, or the hand 202 of FIG. 1. Thus, the power from the motors 21R and 21L is transmitted to the driven member via the transmission mechanism 240, so that the driven member, that is, the link 212, the link 213, or the hand 202 of FIG. 1 is driven.

In the first embodiment, the transmission mechanism 240 is reduction gears, and reduces rotational speeds of the motors 21R and 21L and outputs the power. The transmission mechanism 240 includes a transmission portion 251R that is a first transmission portion, a transmission portion 251L that is a second transmission portion, and an output portion 250. The transmission portion 251R transmits the torque generated by the motor 21R, to the output portion 250. The transmission portion 251L transmits the torque generated by the motor 21L, to the output portion 250. The output portion 250 outputs the torque transmitted by the transmission portion 251R and the transmission portion 251L, to the driven member. That is, the rotation of the motor 21R, which is the first driving source, and the rotation of the motor 21L, which is the second driving source, are both transmitted to the output portion 250.

The transmission portion 251R and the transmission portion 251L, when receiving input torques (rotation input) applied in an identical direction, transmit output torques (rotation output) to be applied in an identical direction, to the identical output portion 250. In addition, the transmission portion 251R and the transmission portion 251L, when receiving input torques (rotation input) applied in different directions, transmit output torques (rotation output) to be applied in different directions, to the identical output portion 250. In the first embodiment, the transmission portion 251R and the transmission portion 251L have an identical configuration and an identical transmission ratio (reduction ratio).

The transmission portion 251R includes a friction wheel 233R engaged with a rotary shaft 232R of the motor 21R, a gear 234R arranged coaxially with the friction wheel 233R, a gear 235R meshing with the gear 234R, and a gear 236R arranged coaxially with the gear 235R. The transmission portion 251L includes a friction wheel 233L engaged with a rotary shaft 232L of the motor 21L, a gear 234L arranged coaxially with the friction wheel 233L, a gear 235L meshing with the gear 234L, and a gear 236L arranged coaxially with the gear 235L. The output portion 250 includes a gear 237 meshing with the gears 236R and 236L, and an output shaft 245 fixed to the gear 237. The output shaft 245 is linked with the driven member, that is, the link 212, the link 213, or the hand 202 of FIG. 1.

In addition, an encoder 24 is disposed in the output portion 250 of the transmission mechanism 240. The encoder 24 is a rotary encoder. The encoder 24 detects a rotation angle of the output portion 250 of the transmission mechanism 240, that is, an angle of a joint of the manipulator 200 of FIG. 1; and outputs a detection signal corresponding to the angle, to the control unit 400 of FIG. 1. The encoder 24 may be an incremental-type encoder or an absolute-type encoder. In addition, the encoder 24 may be an optical encoder, a magnetic encoder, or capacitance-type encoder. In the first embodiment, the encoder 24 is an optical encoder, and includes a scale 24S and a detector 24D disposed so as to face the scale 24S. The scale 24S is fixed to the output shaft 245 via a hub 242. The detector 24D outputs a signal corresponding to a rotational position of the scale 24S, to the control unit 400 of FIG. 1. Thus, the control unit 400 can directly detect the angle of a joint of the manipulator 200 by using the encoder 24. That is, the control unit 400 directly detects the angle of a joint of the manipulator 200, and thereby can control the manipulator 200, specifically the joints J1 to J3, in the full-closed loop control.

In the above-described configuration of the driving device 20, the torque generated by the motor 21R is transmitted to the friction wheel 233R via the rotary shaft 232R, so that the friction wheel 233R and the gear 234R are both rotated. The gear 235R meshing with the gear 234R is rotated together with the gear 236R, by the gear 234R. Thus, the gear 237 meshing with the gear 236R is rotated by the gear 236R that is being rotated. The torque generated by the motor 21L is transmitted to the friction wheel 233L via the rotary shaft 232L, so that the friction wheel 233L and the gear 234L are both rotated. The gear 235L meshing with the gear 234L is rotated together with the gear 236L, by the gear 234L. Thus, the gear 237 meshing with the gear 236L is rotated by the gear 236L that is being rotated. That is, when the motor 21R is driven, the torque is transmitted from the gear 236R of the transmission portion 251R to the gear 237 of the output portion 250. Similarly, when the motor 21L is driven, the torque is transmitted from the gear 236L of the transmission portion 251L to the gear 237 of the output portion 250.

Here, the outer diameter of the rotary shaft 232R is denoted by $D_{232R}$, the outer diameter of the friction wheel 233R is denoted by $D_{233R}$, the pitch circle diameter of the gear 234R is denoted by $D_{234R}$, the pitch circle diameter of the gear 235R is denoted by $D_{235R}$, and the pitch circle diameter of the gear 236R is denoted by $D_{236R}$. Similarly, the outer diameter of the rotary shaft 232L is denoted by $D_{232L}$, the outer diameter of the friction wheel 233L is denoted by $D_{233L}$, the pitch circle diameter of the gear 234L is denoted by $D_{234L}$, the pitch circle diameter of the gear 235L is denoted by $D_{235L}$, and the pitch circle diameter of the gear 236L is denoted by $D_{236L}$. The pitch circle diameter of the gear 237 is denoted by $D_{237}$. The reduction ratio of the transmission portion 251R, which involves meshing between the gear 236R and the gear 237, is denoted by $N_R$. The reduction ratio of the transmission portion 251L, which involves meshing between the gear 236L and the gear 237, is denoted by $N_L$. With these parameters, the reduction ratio $N_R$ and the reduction ratio $N_L$ are expressed by the following equations.

$$N_R=(D_{233R} \times D_{235R} \times D_{237})/(D_{232R} \times D_{234R} \times D_{236R})$$

$$N_L=(D_{233L} \times D_{235L} \times D_{237})/(D_{232L} \times D_{234L} \times D_{236L})$$

Note that the number of gears of the transmission portion 251R, the number of gears of the transmission portion 251L, and the number of gears of the output portion 250 are not limited to the numbers in the above description, and may be one. In addition, the number of friction wheels of the transmission portion 251R and the number of friction wheels of the transmission portion 251L are not limited to the number in the above description. For example, the transmission portions 251R and 251L may not have any friction wheel. In this case, the rotary shaft of each motor may be provided with a gear, and another gear meshing with the gear may be disposed instead of the friction wheel.

In general, the strain-wave-gearing reduction gear used for a joint of a manipulator is expected to output high torque because it produces a large reduction ratio. However, the strain-wave-gearing reduction gear is expensive because it involves a high degree of manufacturing technique. However, the transmission mechanism 240 of the first embodiment can transmit the power while reducing speed, with a simple and inexpensive configuration, without the expensive configuration including the strain-wave-gearing reduction gear. In addition, in the first embodiment, the driving device 20 includes the two motors 21R and 21L for producing high torque.

Figure 3:
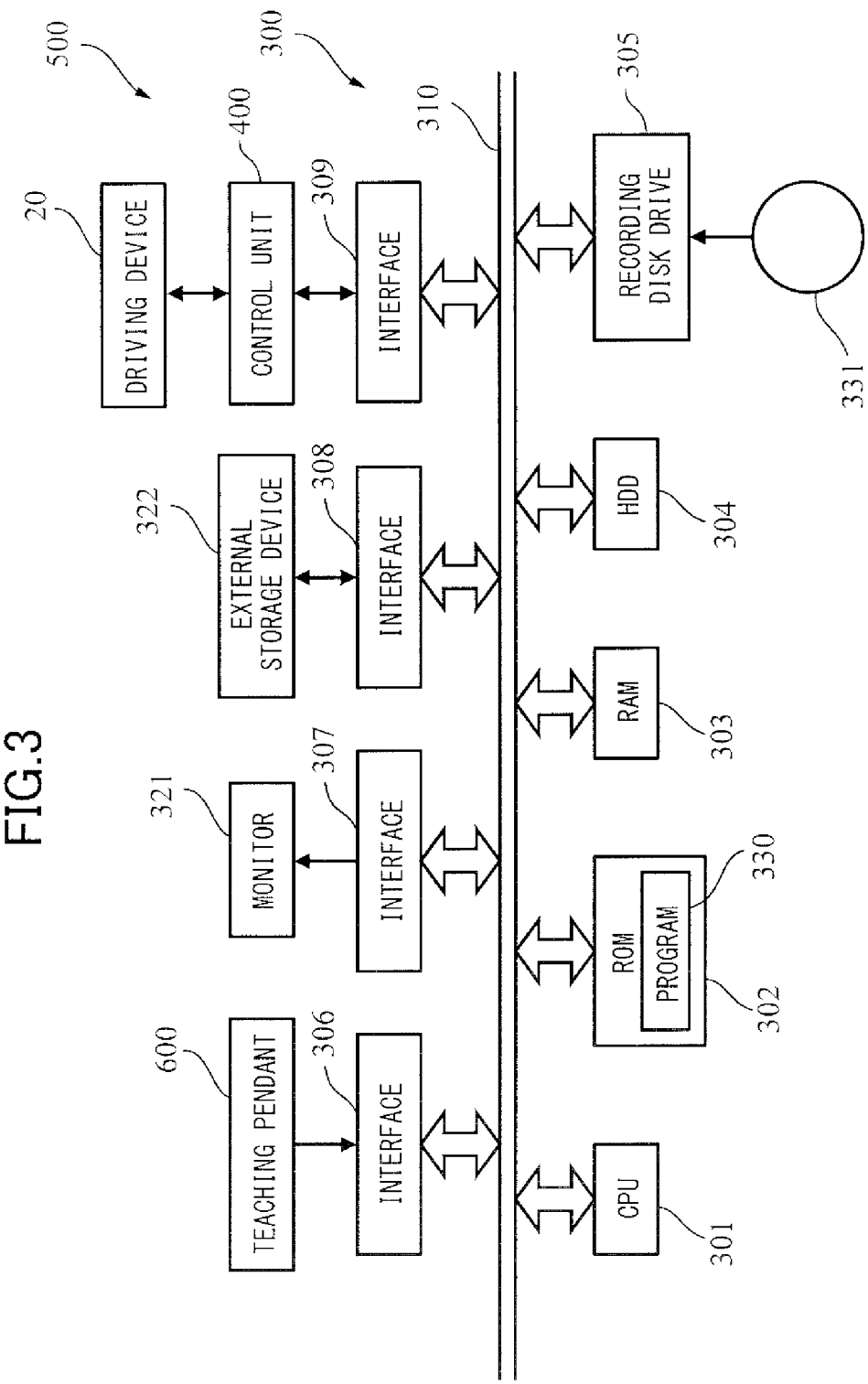
FIG. 3 is a block diagram illustrating a configuration of a control device of the first embodiment.

Next, the control device 500 will be specifically described. FIG. 3 is a block diagram illustrating a configuration of the control device of the first embodiment. As described above, the control device 500 includes the control unit 300 and the control unit 400. FIG. 3 specifically illustrates one example of a hardware configuration of the control unit 300.

The control unit 300 is a computer, and includes a central processing unit (CPU) 301, which serves as a processing unit. The control unit 300 also includes a read only memory (ROM) 302, a random access memory (RAM) 303, and a hard disk drive (HDD) 304, which serve as storage units. The control unit 300 also includes a recording-disk drive 305, and interfaces 306 to 309.

The CPU 301, the ROM 302, the RAM 303, the HDD 304, the recording-disk drive 305, and the interfaces 306 to 309 are communicatively connected with each other via a bus 310. The ROM 302 stores a program 330 that causes the CPU 301 to perform a later-described control method. The CPU 301 performs the later-described control method, depending on the program 330 recorded (stored) in the ROM 302. The RAM 303 is a storage device to temporarily store various types of data, such as results in a computing process performed by the CPU 301.

The HDD 304 is a storage device that can store various types of data, such as results in a computing process performed by the CPU 301 and data obtained from the outside. The recording-disk drive 305 can read various types of data and a program stored in a recording disk 331.

A teaching pendant 600 is connected to the interface 306. The CPU 301 obtains teach data for the manipulator 200, from the teaching pendant 600, via the interface 306 and the bus 310.

The control unit 400 is connected to the interface 309. The CPU 301 outputs command value data to the control unit 400 via the bus 310 and the interface 309 at predetermined control intervals. The control unit 400 controls the driving device 20, depending on command values obtained from the CPU 301. Note that although the driving device 20 is three in number in the first embodiment because the driving device 20 is disposed in each of the joints, FIG. 3 illustrates only one driving device 20 for convenience of description.

The interface 307 is connected with a monitor 321, which displays various images under the control performed by the CPU 301. The interface 308 can be connected with an external storage device 322, such as a rewritable nonvolatile memory or an external HDD. The external storage device 322 can store data, such as teach data.

In the first embodiment, the ROM 302 is a computer-readable recording medium, and stores the program 330. However, the present disclosure is not limited to this. The program 330 may be recorded in any recording medium as long as the recording medium is a computer-readable non-transitory recording medium. Specifically, a flexible disk, a hard disk, an optical disk, a magneto-optical disk, a magnetic tape, a nonvolatile memory, or the like may be used as the recording medium to provide the program 330.

Figure 4:
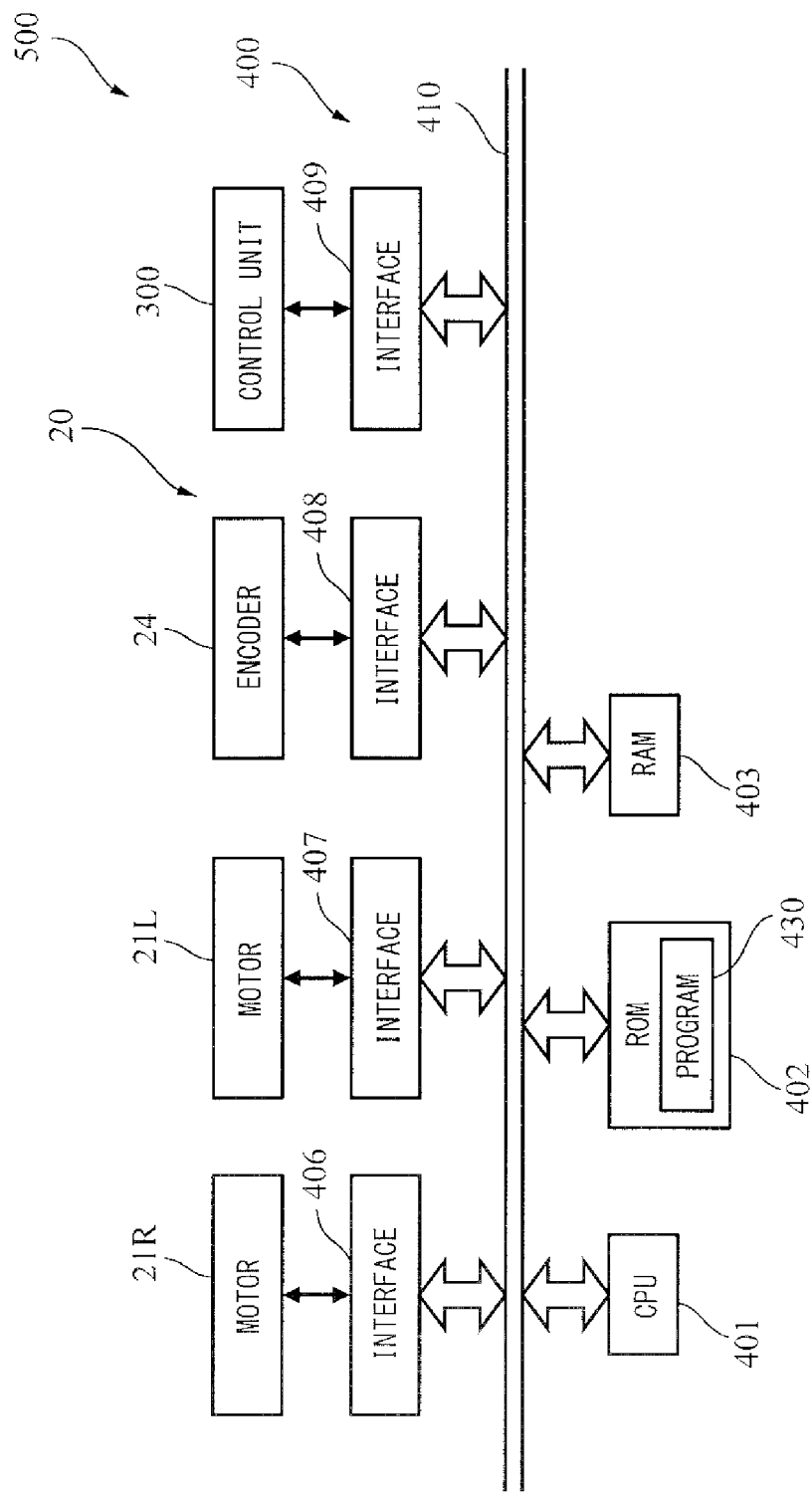
FIG. 4 is a block diagram illustrating a configuration of the control device of the first embodiment.

FIG. 4 is a block diagram illustrating a configuration of the control device of the first embodiment. FIG. 4 specifically illustrates a hardware configuration of the control unit 400. Similar to FIG. 3, FIG. 4 illustrates only one driving device 20.

The control unit 400 is a computer. The control unit 400 includes a CPU 401, which serves as a processing unit; a ROM 402 and a RAM 403, which serve as storage units; and interfaces 406 to 409. The CPU 401, the ROM 402, the RAM 403, and the interfaces 406 to 409 are communicatively connected with each other via a bus 410. The ROM 402 stores a program 430 that causes the CPU 401 to perform a later-described control method.

The interface 406 is connected with the motor 21R. The interface 407 is connected with the motor 21L. The interface 408 is connected with the encoder 24. The interface 409 is connected with the control unit 300.

In the first embodiment, the ROM 402 is a computer-readable recording medium, and stores the program 430. However, the present disclosure is not limited to this. The program 430 may be recorded in any recording medium as long as the recording medium is a computer-readable recording medium. Specifically, a flexible disk, a hard disk, an optical disk, a magneto-optical disk, a magnetic tape, a nonvolatile memory, or the like may be used as the recording medium to provide the program 430.

As described above, the transmission mechanism 240 illustrated in FIG. 2 has a plurality of gears. Thus, the backlash occurs between two adjacent gears included in the plurality of gears and meshing with each other. Specifically, in the transmission portion 251R, the backlash occurs between the gear 234R and the gear 235R, and between the gear 236R and the gear 237. In the transmission portion 251L, the backlash occurs between the gear 234L and the gear 235L, and between the gear 236L and the gear 237. The backlash between gears causes looseness of a joint. The manipulator 200 is required to have high positioning accuracy in one case, and is required to move at high speed in another case. In the first embodiment, the control device 500 controls the driving device 20 in accordance with the requirement.

Figure 5:
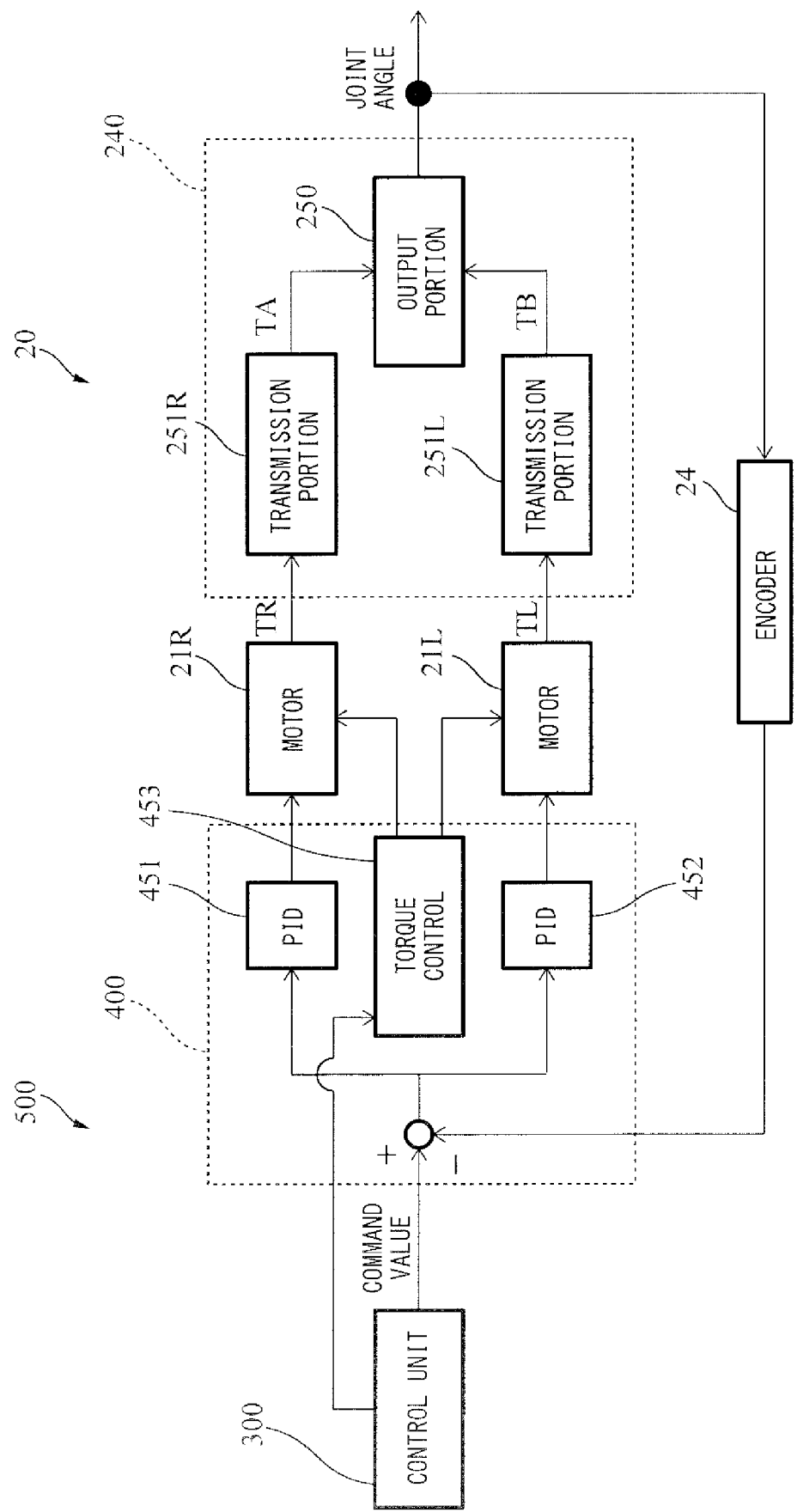
FIG. 5 is a conceptual diagram of processes in which the control device of the first embodiment controls the driving device.

FIG. 5 is a conceptual diagram of processes in which the control device 500 of the first embodiment controls the driving device 20. The control unit 400 controls the motion of the manipulator 200, that is, the angle of a joint of the manipulator 200, in the full-closed loop control, depending on an angle value detected by the encoder 24. Specifically, the control unit 400 performs a PID computation process 451 and a PID computation process 452, depending on the difference between a command value obtained from the control unit 300 and a detection value obtained by the encoder 24. The PID computation process 451 is a process in which the proportional, integral and differential (PID) control is performed on the motor 21R, and the PID computation process 452 is a process in which the PID control is performed on the motor 21L. Although the PID control is performed as one example of feedback control, the present disclosure is not limited to the this. For example, the proportional and integral (PI) control may be performed.

The control unit 400 controls torque TR generated by the motor 21R and torque TL generated by the motor 21L, depending on a command from the control unit 300, for eliminating looseness of a joint, that is, looseness of the transmission mechanism 240. That is, the control unit 400 performs a torque control process 453 for controlling the torque TR and the torque TL by adjusting the amount of control obtained through the PID computation process 451 and the PID computation process 452. In the torque control process 453, the control unit 400 controls current to be supplied to the motors 21R and 21L. Thus, the control unit 300 causes the control unit 400 to control the torque TR generated by the motor 21R and the torque TL generated by the motor 21L.

The transmission portion 251R receives the torque TR, and outputs a torque TA to the output portion 250. The torque TA is a first torque. The transmission portion 251L receives the torque TL, and outputs a torque TB to the output portion 250. The torque TB is a second torque.

The looseness of a joint is mainly caused by the backlash between gears of the transmission portion 251R, the backlash between gears of the transmission portion 251L, the backlash between the transmission portion 251R and the output portion 250, and the backlash between the transmission portion 251L and the output portion 250.

In the first embodiment, the two transmission portions 251R and 251L, when receiving input torques applied in an identical direction, apply output torques to the output portion 250 in an identical direction. Thus, the relationship between the torque TA transmitted from the transmission portion 251R to the output portion 250 and the torque TB transmitted from the transmission portion 251L to the output portion 250 is similar to the relationship between the torque TR generated by the motor 21R and the torque TL generated by the motor 21L. That is, the control device 500 controls current to be supplied to the motors 21R and 21L, and thereby controls the torques TR and TL, and the torques TA and TB. For example, when the torque TR and the torque TL are generated in an identical direction, the torque TA and the torque TB will be generated in an identical direction. In contrast, when the torque TR and the torque TL are generated in directions opposite to each other, the torque TA and the torque TB will be generated in directions opposite to each other. In addition, the magnitude of the torque TR and the magnitude of the torque TA can be controlled by adjusting the amount of current to be supplied to the motor 21R, and the magnitude of the torque TL and the magnitude of the torque TB can be controlled by adjusting the amount of current to be supplied to the motor 21L.

In the first embodiment, the control device 500 controls the torque TR and the torque TL, specifically the magnitude and direction of the torque TR and the magnitude and direction of the torque TL, in accordance with the motion of the manipulator 200 to be performed. With this control, the manipulator 200 can be moved at high speed in one case, and the vibration of the manipulator 200 caused by looseness of the joints J1 to J3 can be suppressed in another case. Therefore, the controllability of the manipulator 200 is improved.

Figure 6:
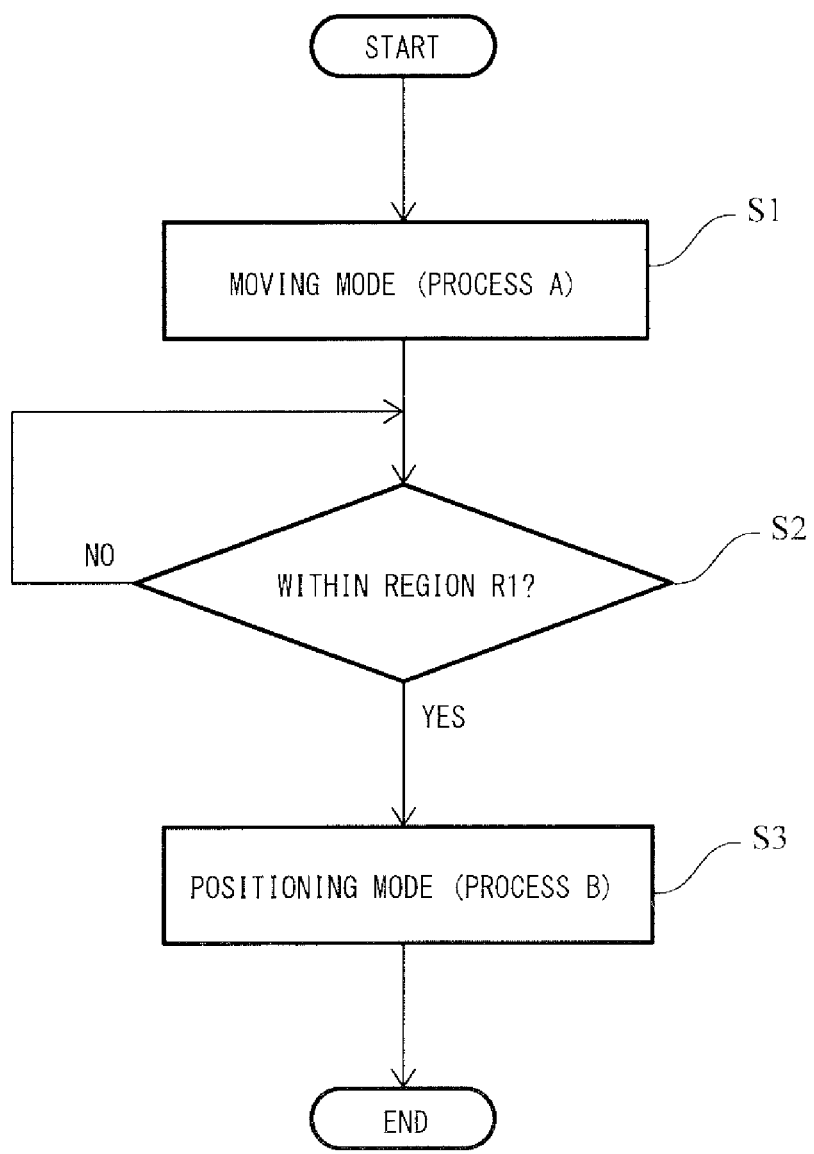
FIG. 6 is a flowchart illustrating a control method performed by the control device of the first embodiment.

Hereinafter, the control for the manipulator 200 performed by the control device 500 will be specifically described. FIG. 6 is a flowchart illustrating a control method for the manipulator 200 performed by the control device 500 of the first embodiment. In the following description, a direction toward which the torque TA or TB is applied to rotate the joints J1 to J3 is defined as a positive direction, and a direction opposite to the positive direction is defined as a negative direction. In addition, in FIG. 1, a target position P and a region R1 are illustrated. The target position P is a predetermined position, and the region R1 is a first region in the vicinity of the target position P. The target position P is included in the region R1. The region R1 may be an imaginary spherical region whose center point is positioned at the target position P. The data on the target position P and the region R1 may be stored in advance in a storage device, such as the HDD 304 or the external storage device 322 of FIG. 3.

In the below-described operation, the manipulator 200 is controlled so as to be moved from a position located outside the region R1 as illustrated in FIG. 1, to the target position P located inside the region R1. Note that the position of the manipulator 200 is the position of an imaginary point that is set in the vicinity of a leading end portion of the manipulator 200. The imaginary point is a so-called tool center point that moves together with the leading end portion of the manipulator 200. The position of the manipulator 200 can be determined with high accuracy from angles of the joints J1 to J3, by performing calculation based on forward kinematics. In the first embodiment, the encoder 24 is disposed in each of the joints J1 to J3. Thus, the control device 500 causes the encoder 24 to detect an angle of each of the joints J1 to J3, and determines the position of the manipulator 200, by using the detection results and performing the calculation based on forward kinematics.

In the first embodiment, the manipulator 200 has two operation modes. A first mode is a moving mode that moves the manipulator 200 so that the hand 202 of the manipulator 200 moves in a work space. A second mode is a positioning mode that moves the manipulator 200 so that the hand 202 of the manipulator 200 is positioned at the target position P. The control device 500 can perform a process A or a process B. The process A is a second process in which the torque TA and the torque TB are generated in an identical direction. The process B is a first process in which the torque TA and the torque TB are generated in directions opposite to each other.

In other words, in the process B, the first driving source 21R and the second driving source 21L are controlled such that when the output portion 250 is rotated toward a predetermined direction, the rotational direction of the output portion 250 is limited to the predetermined direction. In addition, in the process A, the first driving source 21R and the second driving source 21L are controlled such that when the output portion 250 is rotated toward a predetermined direction, the output portion 250 can be rotated toward a direction opposite to the predetermined direction. Thus, the control device 500 selectively performs the process A or the process B depending on the operation (operation mode in the first embodiment) of the manipulator 200.

The control device 500 executes the moving mode, as an operation mode (Step S1). In the first embodiment, when the control device 500 moves the manipulator 200 located outside the region R1, to the target position P, the control device 500 executes the process A. Specifically, the control device 500 drives and controls the two motors 21R and 21L in an identical rotational direction, and thereby causes the torque TA and the torque TB to be generated in an identical positive direction. That is, in the first embodiment, since the transmission portion 251R and the transmission portion 251L have an identical configuration, the control device 500 causes the torque TR and the torque TL to be generated in an identical direction for generating the torque TA and the torque TB in an identical direction. With this operation, the joints of the manipulator 200 move at high speed.

In this time, the control device 500 may execute the process A while making the magnitude of the torque TA equal to the magnitude of the torque TB, but preferably, the control device 500 executes the process A while making the magnitude of the torque TA different from the magnitude of the torque TB. In the first embodiment, since the transmission portion 251R and the transmission portion 251L have an identical configuration, the control device 500 preferably makes the magnitude of the torque TR different from the magnitude of the torque TL. That is, in the process A, for moving the joints of the manipulator 200 at high speed, the motor 21R and the motor 21L are controlled such that when an external force is applied to the output portion 250 while the gear (first convex portion) 236R of the first transmission portion 251R and the gear (second convex portion) 236L of the second transmission portion 251L are in contact with the output portion 250, the gear 236R and the gear 236L can be separated from the output portion 250 (that is, the backlash can occur). In this case, since the magnitude of the torque TA is made different from the magnitude of the torque TB, the vibration caused by looseness of joints due to the backlash between the transmission portion 251R and the output portion 250 and between the transmission portion 251L and the output portion 250 can be suppressed. Specifically, the vibration caused by looseness of joints due to the backlash between the gear 236R and the gear 237 and between the gear 236L and the gear 237 can be suppressed. In addition, when each of the transmission portions 251R and 251L has a plurality of gears, the vibration caused by looseness of joints due to the backlash of each of the transmission portions 251R and 251L can be suppressed. Specifically, the vibration caused by looseness of joints due to the backlash between the gear 234R and the gear 235R and between the gear 234L and the gear 235L can be suppressed.

Note that the control device 500 may change the control gain of the PID computation processes 451 and 452, in Step S1, for adapting the control gain to the motion of the manipulator 200.

Then the control device 500 determines whether the position of the manipulator 200 is within the region R1 (S2). Specifically, the control device 500 calculates the position of the manipulator 200 by using the above-described method, and determines whether the difference between the target position P and a calculated position is equal to or smaller than a first value. The first value is a radius of the region R1. If the position of the manipulator 200 is not within the region R1 (S2: NO), or the manipulator 200 is located outside the region R1, then the control device 500 continues the moving mode.

If the position of the manipulator 200 is within the region R1 (S2: YES), or the manipulator 200 is located inside the region R1, then the control device 500 changes the operation mode from the moving mode to the positioning mode (S3). In the first embodiment, the control device 500 executes the process B in the positioning mode.

In Step S3, the control device 500 drives and controls the two motors 21R and 21L in rotational directions different from each other, so that the torque TA and the torque TB are generated in directions different from each other such that one of the torque TA and the torque TB is generated in a positive direction and the other is generated in a negative direction. That is, in the first embodiment, since the transmission portion 251R and the transmission portion 251L have an identical configuration, the direction of the torque TR is made different from the direction of the torque TL. In this time, the control device 500 executes the process B while making the magnitude of the torque TA different from the magnitude of the torque TB, so that the manipulator 200 moves toward the target position P. For example, if a direction in which the torque TA is generated is equal to a direction in which the manipulator 200 moves toward the target position P, |TA|>|TB|. In the first embodiment, since the transmission portion 251R and the transmission portion 251L have an identical configuration, the magnitude of the torque TR is made different from the magnitude of the torque TL.

Thus, in the process B, the motor 21R and the motor 21L are controlled such that when an external force is applied to the output portion 250 while the gear (first convex portion) 236R of the first transmission portion 251R and the gear (second convex portion) 236L of the second transmission portion 251L are in contact with the output portion 250, the gear 236R and the gear 236L cannot be separated from the output portion 250 (that is, the backlash does not occur). Thus, the manipulator 200 can be positioned at the target position P while the vibration of joints of the manipulator 200, that is, the vibration of the hand 202 of the manipulator 200 is suppressed. As a result, the manipulator 200 can be quickly positioned at the target position P.

Note that the control device 500 may change the control gain of the PID computation processes 451 and 452, in Step S3 for adapting the control gain to the positioning of the manipulator 200.

As described above, in the first embodiment, the control device 500 executes the process A in the moving mode of Step S1, and executes the process B in the positioning mode of Step S3. With this operation, the control device 500 can move the manipulator 200 at high speed in the moving mode, and position the manipulator 200 at high accuracy in the positioning mode while suppressing the vibration of the manipulator 200 caused by looseness of joints. Thus, the control device 500 selectively executes the process A or the process B, depending on the motion of the manipulator 200 to be performed, so that the controllability of the manipulator 200 is improved.

Second Embodiment

Figure 7:
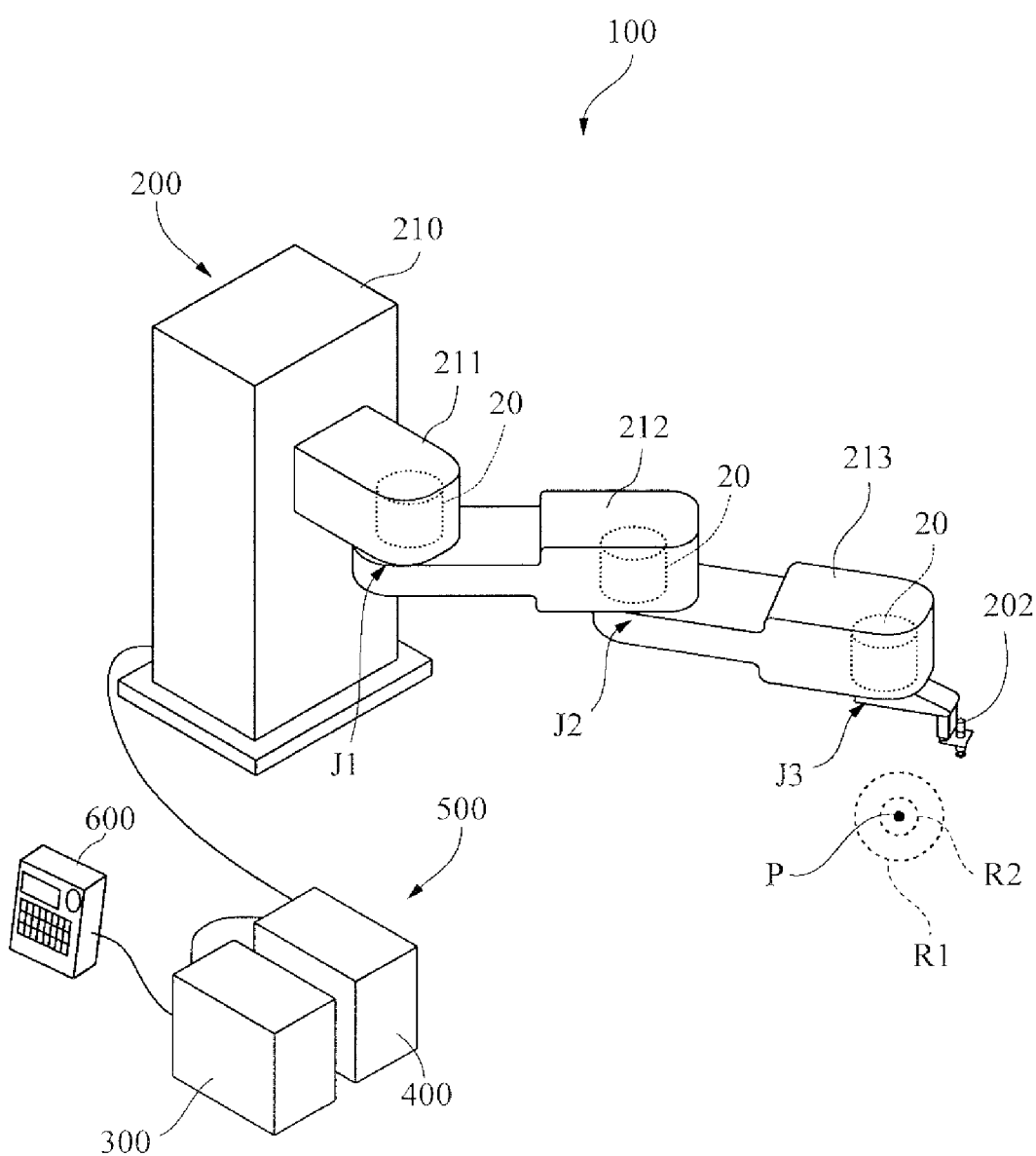
FIG. 7 is a perspective view illustrating a robot of a second embodiment.

Next, a robot of a second embodiment will be described. FIG. 7 is a perspective view illustrating the robot of the second embodiment. Since the configuration of the robot 100 of the second embodiment is the same as that of the first embodiment, the robot 100 is given the same symbols and the description thereof will be omitted.

Figure 8:
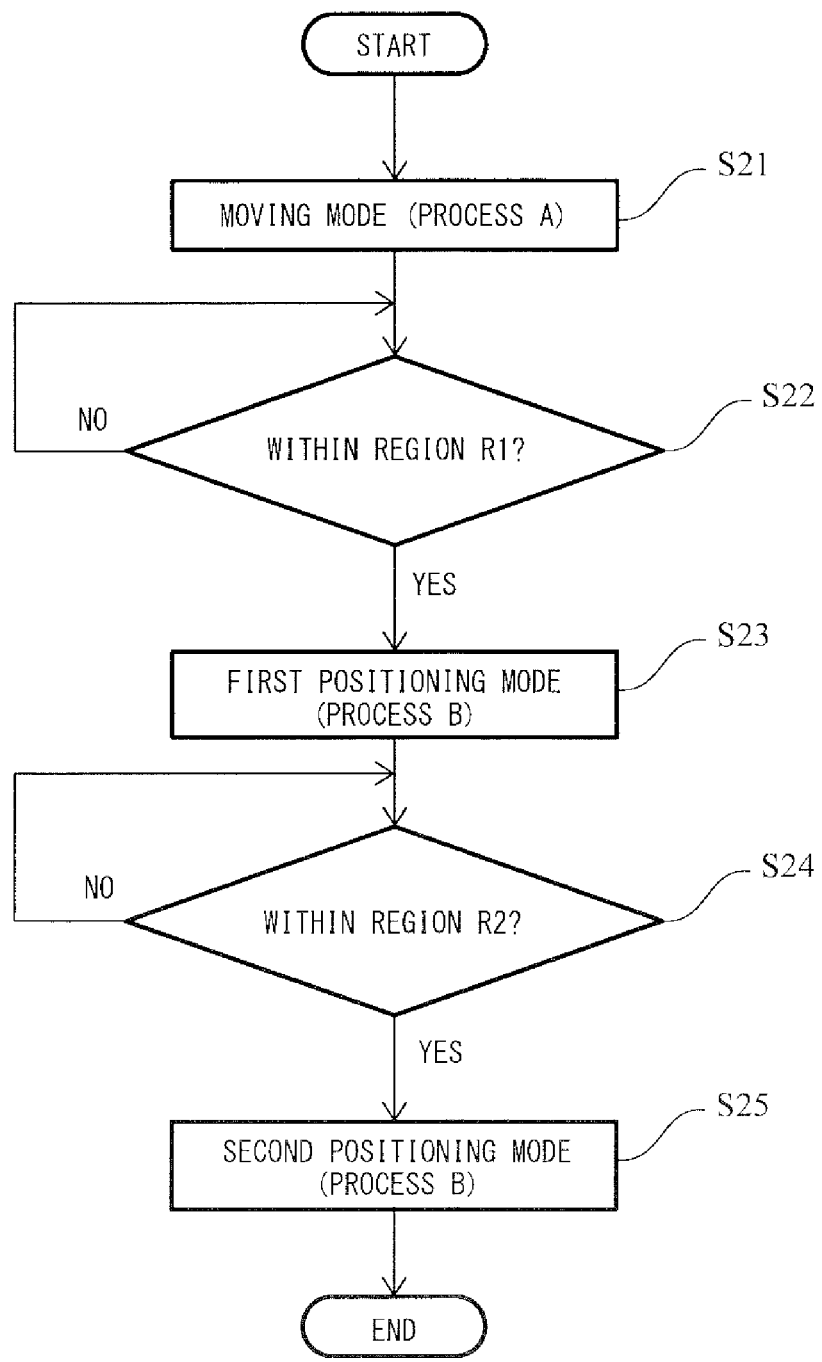
FIG. 8 is a flowchart illustrating a control method performed by a control device of the second embodiment.

Hereinafter, the control for the manipulator 200 performed by the control device 500 will be specifically described. FIG. 8 is a flowchart illustrating a control method for the manipulator 200 performed by the control device 500 of the second embodiment. In FIG. 7, the target position P and the region R1 are illustrated. The target position P is a predetermined position, and the region R1 is the first region in the vicinity of the target position P. The target position P is included in the region R1. The region R1 may be an imaginary spherical region whose center point is positioned at the target position P. In the second embodiment, a region R2 is additionally defined as a second region. The region R2 includes the target position P, and is smaller than the region R1. The region R2 may be an imaginary spherical region whose center point is positioned at the target position P and which is smaller than the region R1. The data on the target position P, the region R1, and the region R2 may be stored in advance in a storage device, such as the HDD 304 or the external storage device 322 of FIG. 3.

The control device 500 executes Step S21 and Step S22. Step S21 is the same as Step S1 of FIG. 6 described in the first embodiment. With this process, the joints of the manipulator 200 move at high speed. Step S22 is the same as Step S2 of FIG. 6 described in the first embodiment.

If the position of the manipulator 200 is within the region R1 (S22: YES), or the manipulator 200 is located inside the region R1 and outside the region R2, then the control device 500 changes the operation mode from the moving mode to a first positioning mode (S23). In the second embodiment, the control device 500 executes the process B in the first positioning mode. The first positioning mode is the same as the positioning mode described in the first embodiment. That is, Step S23 is the same as Step S3 of FIG. 6 described in the first embodiment. Specifically, in Step S23, the magnitude of the torque TA and the magnitude of torque TB are determined so as to suppress the vibration of the joints.

Then the control device 500 determines whether the position of the manipulator 200 is within the region R2 (S24). Specifically, the control device 500 calculates the position of the manipulator 200, and determines whether the difference between the target position P and a calculated position is equal to or smaller than a second value that is smaller than the first value. The second value is a radius of the region R2. If the position of the manipulator 200 is not within the region R2 (S24: NO), or the manipulator 200 is located outside the region R2, then the control device 500 continues the first positioning mode.

If the position of the manipulator 200 is within the region R2 (S24: YES), or the manipulator 200 is located inside the region R2, then the control device 500 changes the operation mode from the first positioning mode to a second positioning mode (S25). In the second embodiment, the control device 500 decreases the magnitude of the torque TA and the magnitude of the torque TB in the second positioning mode, and executes the process B. That is, the control device 500 makes the magnitude of the torque TA and the magnitude of the torque TB smaller than the magnitude of the torque TA and the magnitude of the torque TB obtained when the position of the manipulator 200 is located inside the region R1 and outside the region R2. In Step S25, the control device 500 executes the process B, as in Step S23, while making the magnitude of the torque TA different from the magnitude of the torque TB, such that the manipulator 200 moves toward the target position P. In the second embodiment, since the transmission portion 251R and the transmission portion 251L have an identical configuration, the magnitude of the torque TR is made different from the magnitude of the torque TL, such that the manipulator 200 moves toward the target position P.

In Step S25, since the amplitude of vibration of the hand 202 is within the region R2, the value of the current to be supplied to the motors 21R and 21L is made smaller. Thus, the power consumption can be reduced, and the heat generation of the motors 21L and 21R can be suppressed. As a result, the energy loss can be reduced.

Third Embodiment

Next, a robot of a third embodiment will be described. In the third embodiment, a specific example in which a product is manufactured by using the robot will be described. Since the configuration of the robot of the third embodiment is the same as that of the first embodiment, the description thereof will be omitted.

Figure 9:
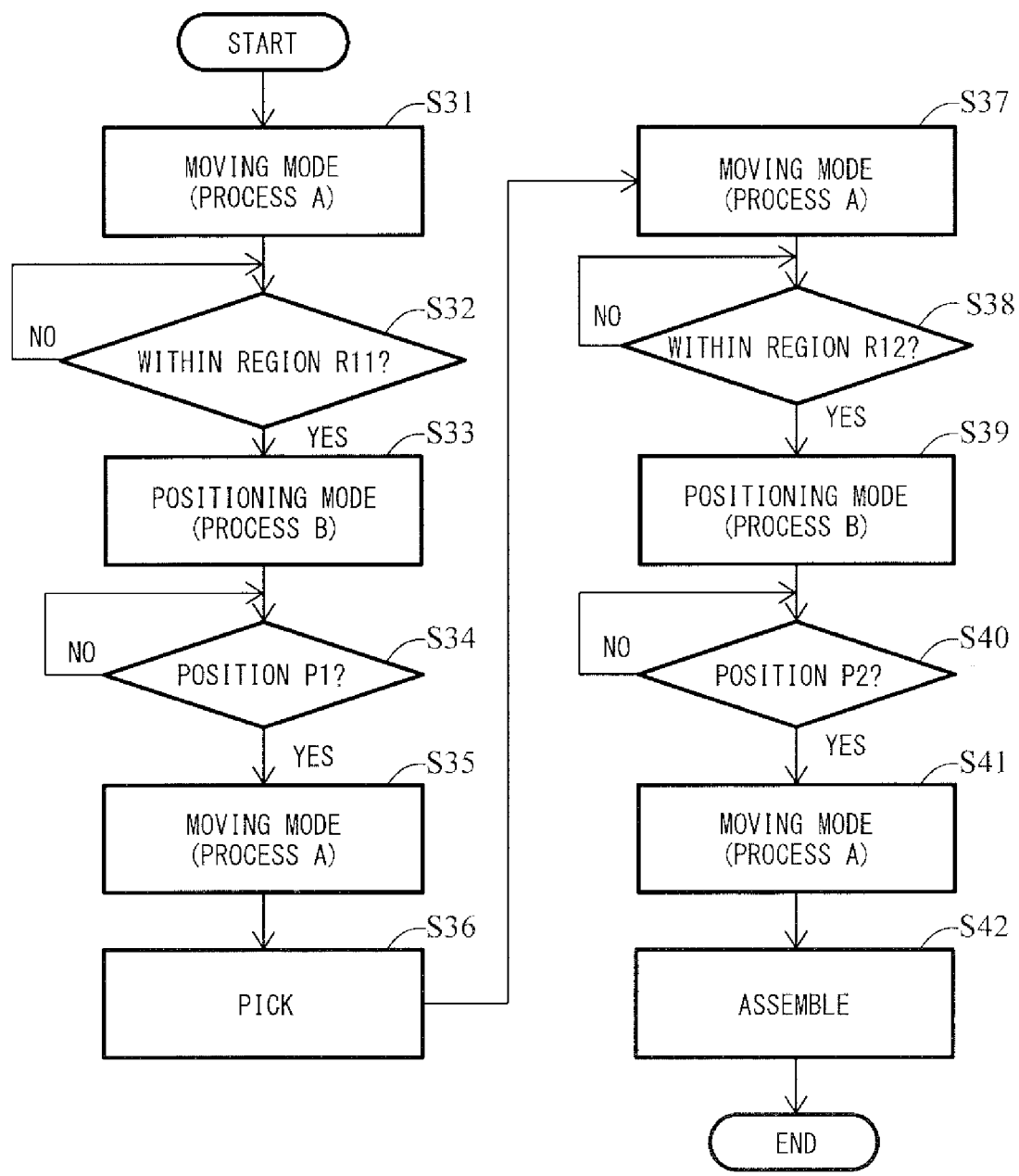
FIG. 9 is a flowchart illustrating a method of manufacturing a product, performed by using a robot of a third embodiment.

FIG. 9 is a flowchart illustrating a method of manufacturing a product, performed by using the robot of the third embodiment. FIG. 10 is an explanatory diagram illustrating the method of manufacturing a product, performed by using the robot of the third embodiment. In the third embodiment, the description will be made for a case where a workpiece W1 illustrated in FIG. 10 is assembled to a workpiece W2 for manufacturing a product. The workpiece W1 is a first workpiece, and the workpiece W2 is a second workpiece. In FIG. 10, a path of the hand 202 that moves in a movement range of the manipulator 200 is schematically illustrated with a solid line. The control method for the manipulator 200 performed by the control device 500 is the same as that of the first embodiment. In addition, the torques TA, TB, TR, and TL are the same as those described in the first embodiment with reference to FIG. 5.

In the third embodiment, there are two target positions, which are predetermined positions. The first target position is a position P1 at which the hand 202 starts a motion to hold the workpiece W1. The second target position is a position P2 at which the hand 202 starts a motion to assemble the workpiece W1 to the workpiece W2. In FIG. 10, the position P1 and a region R11 are illustrated. The region R11 is a first region in the vicinity of the position P1. The position P1 is included in the region R11. The region R11 may be an imaginary spherical region whose center point is positioned at the position P1. Similarly, in FIG. 10, the position P2 and a region R12 are illustrated. The region R12 is a first region in the vicinity of the position P2. The position P2 is included in the region R12. The region R12 may be an imaginary spherical region whose center point is positioned at the position P2. The data on the position P1, the position P2, the region R11, and the region R12 may be stored in advance in a storage device, such as the HDD 304 or the external storage device 322 of FIG. 3.

Hereinafter, a method that causes the manipulator 200 to pick the workpiece W1 and assemble the workpiece W1 to the workpiece W2 will be described as one example of a method of manufacturing a product.

The control device 500 executes the moving mode, as an operation mode (Step S31). Step S31 is the same as Step S1 of FIG. 6 described in the first embodiment. In the third embodiment, when the control device 500 moves the manipulator 200 located outside the region R11, to the position P1, the control device 500 executes the process A. Specifically, the control device 500 drives and controls the two motors 21R and 21L in an identical rotational direction, and thereby causes the torque TA and the torque TB to be generated in an identical positive direction. That is, in the third embodiment, since the transmission portion 251R and the transmission portion 251L have an identical configuration, the control device 500 causes the torque TR and the torque TL to be generated in an identical direction. With this process, the joints of the manipulator 200 move at high speed.

In this time, the control device 500 may execute the process A while making the magnitude of the torque TA equal to the magnitude of the torque TB, but preferably, the control device 500 executes the process A while making the magnitude of the torque TA different from the magnitude of the torque TB. In the third embodiment, since the transmission portion 251R and the transmission portion 251L have an identical configuration, the control device 500 preferably makes the magnitude of the torque TR different from the magnitude of the torque TL. Since the magnitude of the torque TA is made different from the magnitude of the torque TB, the vibration caused by looseness of joints due to the backlash between the transmission portion 251R and the output portion 250 and between the transmission portion 251L and the output portion 250 can be suppressed. Specifically, the vibration caused by looseness of joints due to the backlash between the gear 236R and the gear 237 and between the gear 236L and the gear 237 can be suppressed. In addition, when each of the transmission portions 251R and 251L has a plurality of gears, the vibration caused by looseness of joints due to the backlash of each of the transmission portions 251R and 251L can be suppressed. Specifically, the vibration caused by looseness of joints due to the backlash between the gear 234R and the gear 235R and between the gear 234L and the gear 235L can be suppressed.

Then the control device 500 determines whether the position of the manipulator 200 is within the region R11 (S32). Step S32 is the same as Step S2 of FIG. 6 described in the first embodiment. If the position of the manipulator 200 is not within the region R11 (S32: NO), or the manipulator 200 is located outside the region R11, then the control device 500 continues the moving mode.

If the position of the manipulator 200 is within the region R11 (S32: YES), or the manipulator 200 is located inside the region R11, then the control device 500 changes the operation mode from the moving mode to the positioning mode (S33). In the third embodiment, the control device 500 executes the process B in the positioning mode. Step S33 is the same as Step S3 of FIG. 6 described in the first embodiment. In Step S33, the control device 500 drives and controls the two motors 21R and 21L in rotational directions different from each other, so that the torque TA and the torque TB are generated in directions different from each other such that one of the torque TA and the torque TB is generated in a positive direction and the other is generated in a negative direction. That is, in the third embodiment, since the transmission portion 251R and the transmission portion 251L have an identical configuration, the direction of the torque TR is made different from the direction of the torque TL. In this time, the control device 500 executes the process B while making the magnitude of the torque TA different from the magnitude of the torque TB, such that the manipulator 200 moves toward the position P1. For example, if a direction in which the torque TA is generated is equal to a direction in which the manipulator 200 moves toward the position P1, |TA|>|TB|. In the third embodiment, since the transmission portion 251R and the transmission portion 251L have an identical configuration, the magnitude of the torque TR is made different from the magnitude of the torque TL.

Thus, the manipulator 200 can be positioned at the position P1 while the vibration of joints of the manipulator 200, that is, the vibration of the hand 202 of the manipulator 200 is suppressed. As a result, the manipulator 200 can be quickly positioned at the position P1.

Then the control device 500 determines whether the manipulator 200 is positioned at the position P1 (S34). If the manipulator 200 is not positioned at the position P1 (S34: NO), then the control device 500 continues the positioning mode.

If the manipulator 200 is positioned at the position P1 (S34: YES), then the control device 500 changes the operation mode from the positioning mode to the moving mode (S35). That is, after positioning the manipulator 200 at the position P1, the control device 500 moves the manipulator 200 from the position P1 so that the hand 202 moves toward the workpiece W1. In this time, the control device 500 executes the process A, preferably making the magnitude of the torque TA equal to the magnitude of the torque TB. In the third embodiment, since the transmission portion 251R and the transmission portion 251L have an identical configuration, the control device 500 preferably makes the magnitude of the torque TR equal to the magnitude of the torque TL. With this operation, the joints of the manipulator 200, that is, the transmission mechanism 240 has looseness, which ensures the compliance.

With the compliance ensured, the control device 500 moves the manipulator 200, and causes the manipulator 200 to hold (pick) the workpiece W1 (S36). Since the compliance is ensured, the manipulator 200 can reliably hold the workpiece W1.

Then the control device 500 executes the moving mode, as an operation mode (Step S37). Step S37 is the same as Step S1 of FIG. 6 described in the first embodiment. In the third embodiment, when the control device 500 positions the manipulator 200 located outside the region R12, at the position P2 by moving the manipulator 200, the control device 500 executes the process A. Specifically, the control device 500 drives and controls the two motors 21R and 21L in an identical rotational direction, and thereby causes the torque TA and the torque TB to be generated in an identical positive direction. That is, in the third embodiment, since the transmission portion 251R and the transmission portion 251L have an identical configuration, the control device 500 causes the torque TR and the torque TL to be generated in an identical direction. With this process, the joints of the manipulator 200 move at high speed.

In this time, the control device 500 may execute the process A while making the magnitude of the torque TA equal to the magnitude of the torque TB, but preferably, the control device 500 executes the process A while making the magnitude of the torque TA different from the magnitude of the torque TB. In the third embodiment, since the transmission portion 251R and the transmission portion 251L have an identical configuration, the control device 500 preferably makes the magnitude of the torque TR different from the magnitude of the torque TL. Since the magnitude of the torque TA is made different from the magnitude of the torque TB, the vibration caused by looseness of joints due to the backlash between the transmission portion 251R and the output portion 250 and between the transmission portion 251L and the output portion 250 of FIG. 2 can be suppressed. Specifically, the vibration caused by looseness of joints due to the backlash between the gear 236R and the gear 237 and between the gear 236L and the gear 237 can be suppressed. In addition, when each of the transmission portions 251R and 251L has a plurality of gears, the vibration caused by looseness of joints due to the backlash of each of the transmission portions 251R and 251L can be suppressed. Specifically, the vibration caused by looseness of joints due to the backlash between the gear 234R and the gear 235R and between the gear 234L and the gear 235L can be suppressed.

Then the control device 500 determines whether the position of the manipulator 200 is within the region R12 (S38). Step S38 is the same as Step S2 of FIG. 6 described in the first embodiment. If the position of the manipulator 200 is not within the region R12 (S38: NO), or the manipulator 200 is located outside the region R12, then the control device 500 continues the moving mode.

If the position of the manipulator 200 is within the region R12 (S38: YES), or the manipulator 200 is located inside the region R12, then the control device 500 changes the operation mode from the moving mode to the positioning mode (S39). In the third embodiment, the control device 500 executes the process B in the positioning mode. Step S39 is the same as Step S3 of FIG. 6 described in the first embodiment. In Step S39, the control device 500 drives and controls the two motors 21R and 21L in rotational directions different from each other, so that the torque TA and the torque TB are generated in directions different from each other such that one of the torque TA and the torque TB is generated in a positive direction and the other is generated in a negative direction. That is, in the third embodiment, since the transmission portion 251R and the transmission portion 251L have an identical configuration, the direction of the torque TR is made different from the direction of the torque TL. In this time, the control device 500 executes the process B while making the magnitude of the torque TA different from the magnitude of the torque TB, such that the manipulator 200 moves toward the position P2. For example, if a direction in which the torque TA is generated is equal to a direction in which the manipulator 200 moves toward the position P2, |TA|>|TB|. In the third embodiment, since the transmission portion 251R and the transmission portion 251L have an identical configuration, the magnitude of the torque TR is made different from the magnitude of the torque TL.

Thus, the manipulator 200 can be positioned at the position P2 while the vibration of joints of the manipulator 200, that is, the vibration of the hand 202 of the manipulator 200 is suppressed. As a result, the manipulator 200 can be quickly positioned at the position P2.

Then the control device 500 determines whether the manipulator 200 is positioned at the position P2 (S40). If the manipulator 200 is not positioned at the position P2 (S40: NO), then the control device 500 continues the positioning mode.

If the manipulator 200 is positioned at the position P2 (S40: YES), then the control device 500 changes the operation mode from the positioning mode to the moving mode (S41). That is, after positioning the manipulator 200 at the position P2, the control device 500 moves the manipulator 200 from the position P2 so that the hand 202 of the manipulator 200 that is holding the workpiece W1 moves toward the workpiece W2. In this time, the control device 500 executes the process A, preferably making the magnitude of the torque TA equal to the magnitude of the torque TB. In the third embodiment, since the transmission portion 251R and the transmission portion 251L have an identical configuration, the control device 500 preferably makes the magnitude of the torque TR equal to the magnitude of the torque TL. With this operation, the joints of the manipulator 200, that is, the transmission mechanism 240 has looseness, which ensures the compliance.

With the compliance ensured, the control device 500 moves the manipulator 200, and causes the manipulator 200 to assemble the workpiece W1 held by the manipulator 200, to the workpiece W2 (S42). Since the compliance is ensured, the manipulator 200 can reliably assemble the workpiece W1 to the workpiece W2. In the third embodiment, the control device 500 causes the manipulator 200 to fit the workpiece W1 in the workpiece W2. The distance in which the compliance is ensured (distance in Step S35 and distance in Step S41) is set to have a minimum value in view of the tolerance of the workpieces and the manipulator.

As described above, in the third embodiment, since the manipulator 200 has the compliance in Step S36 and Step S42 in which the compliance is required, the workpiece W1 is easily held and assembled to the workpiece W2. Therefore, the controllability of the manipulator 200 is improved.

The present invention is not limited to the above-described embodiments, and can be variously modified within the technical concept of the present invention. In addition, the effects described in the embodiments are merely the most suitable effects produced by the present invention. Thus, the effects by the present invention are not limited to those described in the embodiments.

In the above-described embodiments, the encoder 24 is used as a detection unit for detecting an angle of each joint. However, the present disclosure is not limited to this. The detection unit may be any unit as long as the unit can detect an angle of each joint. For example, the detection unit may be a resolver.

In addition, in the above-described embodiments, the transmission mechanism 240 is the reduction gears. However, the present disclosure is not limited to this. In addition, although the reduction gears are used as the transmission mechanism in the above-described embodiments, the present disclosure is not limited to this. For example, the reduction mechanism may not be the gears.

In addition, in the above-described embodiments, the hand 202 is used as an end effector. However, the present disclosure is not limited to this. For example, the end effector may be a tool with which some work is performed on a workpiece.

In addition, in the above-described embodiments, the manipulator 200 is a horizontally articulated robot arm. However, the present disclosure is not limited to this. For example, the manipulator 200 may be a vertically articulated robot arm, a parallel link robot arm, or a Cartesian coordinate robot arm.

In addition, in the above-described embodiments, the first driving source and the second driving source of the driving device 20 of the manipulator 200 are motors. However, the present disclosure is not limited to this. For example, each driving source may be another device such as an artificial muscle.

In the above-described embodiments, the processes of the control unit 300 and the control unit 400 of the control device 500 are executed by software. However, the present disclosure is not limited to this. For example, part or all of the processing functions of the control unit 300 may be executed by hardware (circuit configuration). In addition, part or all of the processing functions of the control unit 400 may be executed by hardware (circuit configuration). Furthermore, in the above-described embodiments, the control device 500 is constituted by the control unit 300 and the control unit 400. However, the present disclosure is not limited to this. For example, the control device 500 may be a single computer, or a plurality of computers.

OTHER MODIFICATIONS

The present invention can also be achieved by providing a program, which performs one or more functions of the above-described embodiments, to a system or a device via a network or a storage medium, and by one or more processors, which are included in the system or the device, reading and executing the program. In addition, the present invention can also be achieved by using a circuit, such as an ASIC, which performs one or more functions.

In addition, the above-described embodiments can be applied to any machine that can automatically perform expansion and contraction motion, bending and stretching motion, up-and-down motion, right-and-left motion, pivot motion, or combination motion thereof, depending on information data stored in the storage device of the control device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-042675, filed Mar. 8, 2019, which is hereby incorporated by reference herein in its entirety.

What is claimed is:

1. A robot comprising:
an end effector configured to hold a first workpiece;
a robot arm configured to move the end effector and cause the first workpiece to contact a second workpiece, the robot arm including:
a first driving source;
a second driving source; and
an output portion to which both rotation of the first driving source and rotation of the second driving source are transmitted; and
a control device configured to execute a first process and a second process,
wherein, in the first process, the control device controls the first driving source and the second driving source such that when the output portion is rotated toward a predetermined direction, a rotational direction of the output portion is limited to the predetermined direction, and
wherein, in the second process, the control device controls the first driving source and the second driving source such that when the output portion is rotated toward the predetermined direction, the output portion is able to rotate toward a direction opposite to the predetermined direction,
wherein, in a case where the second process is executed to control the end effector via the output portion to move the first workpiece, the control device controls the first driving source and the second driving source such that a first torque generated by the first driving source and a second torque generated by the second driving source are made different and a difference is generated between the first torque and the second torque, and
wherein, in a case where the second process is executed to control the end effector via the output portion to cause the first workpiece to contact the second workpiece, the control device controls the first driving source and the second driving source such that the first torque generated by the first driving source and the second torque generated by the second driving source are controlled such that the difference between the first torque and the second torque is less than the difference between the first torque and the second torque in the case where the second process is executed to control the end effector via the output portion to move the first workpiece.

2. The robot according to claim 1, further comprising:
a first transmission portion configured to transmit the rotation of the first driving source to the output portion; and
a second transmission portion configured to transmit the rotation of the second driving source to the output portion,
wherein the control device is configured to:
control the first driving source and the second driving source in the first process such that when an external force is applied to the output portion while a first convex portion of the first transmission portion and a second convex portion of the second transmission portion are in contact with the output portion, the first convex portion and the second convex portion are not able to be separated from the output portion, and
control the first driving source and the second driving source in the second process such that when an external force is applied to the output portion while the first convex portion and the second convex portion are in contact with the output portion, the first convex portion and the second convex portion are able to be separated from the output portion.

3. The robot according to claim 2, wherein the first transmission portion includes a first gear contacting the output portion and a third gear coaxially provided with the first gear via a first shaft, and wherein the second transmission portion includes a second gear contacting the output portion and a fourth gear coaxially provided with the second gear via a second shaft.

4. The robot according to claim 3, wherein the rotation of the first driving source is transmitted to the first transmission portion via a first friction wheel and the rotation of the second driving source is transmitted to the second transmission portion via a second friction wheel, and wherein a fifth gear engaging the third gear is provided on the first friction wheel and a sixth gear engaging the fourth gear is provided on the second friction wheel.

5. The robot according to claim 1, wherein the robot is configured to select and execute the first process or the second process depending on a motion of the robot to be performed.

6. The robot according to claim 1, wherein, in a case where the control device positions the end effector at a predetermined position, the control device executes the second process in a case where the end effector is located outside a first region that includes the predetermined position, and executes the first process in a case where the output portion is located inside the first region.

7. The robot according to claim 6, wherein, when the control device executes the first process and the end effector is located in a second region that includes the predetermined position and is smaller than the first region, the control device makes a magnitude of the first torque and a magnitude of the second torque less than a magnitude of the first torque and a magnitude of the second torque obtained when the end effector is located inside the first region and outside the second region.

8. The robot according to claim 1 wherein the control device is configured to position the end effector at a predetermined position via the output portion by executing the first process and cause the end effector to hold the first workpiece.

9. The robot according to claim 1, further comprising a detection unit configured to detect a position of the output portion, wherein the control device moves the robot in full-closed loop control performed depending on a detection result from the detection unit.

10. The robot according to claim 9, wherein the detection unit is located on a rotation axis that is different from a rotation axis of the first driving source and a rotation axis of the second driving source.

11. The robot according to claim 1, wherein, in the case where the second process is executed to control the end effector via the output portion to cause the first workpiece to contact the second workpiece, the control device controls the first driving source and the second driving source such that the first torque generated by the first driving source and the second torque generated by the second driving source become the same.

12. The robot according to claim 1, wherein, in a case where the first process is executed, the control device is configured to control the first driving source and the second driving source such that a rotation direction of the first driving source is different from a rotation direction of the second driving source, and wherein, in a case where the second process is executed, the control device is configured to control the first driving source and the second driving source such that the rotation direction of the first driving source is the same as the rotation direction of the second driving source.

13. A method of controlling a robot performed by a control device, the robot including:

an end effector configured to hold a first workpiece, and
a robot arm configured to move the end effector and cause the first workpiece to contact a second workpiece, the robot arm including:
a first driving source,
a second driving source, and
an output portion to which both rotation of the first driving source and rotation of the second driving source are transmitted, the method comprising:

executing, by the control device, a first process or a second process depending on a motion of the robot to be performed, wherein in the first process, the control device controls the first driving source and the second driving source such that when the output portion is rotated toward a predetermined direction, a rotational direction of the output portion is limited to the predetermined direction, wherein in the second process, the control device controls the first driving source and the second driving source such that when the output portion is rotated toward the predetermined direction, the output portion is able to rotate toward a direction opposite to the predetermined direction, wherein, in a case where the second process is executed to control the end effector via the output portion to move the first workpiece, the control device controls the first driving source and the second driving source such that a first torque generated by the first driving source and a second torque generated by the second driving source are made different and a difference is generated between the first torque and the second torque, and wherein, in a case where the second process is executed to control the end effector via the output portion to cause the first workpiece to contact the second workpiece, the control device controls the first driving source and the second driving source such that the first torque generated by the first driving source and the second torque generated by the second driving source are controlled such that the difference between the first torque and the second torque is less than the difference between the first torque and the second torque in the case where the second process is executed to control the end effector via the output portion to move the first workpiece.

14. A computer-readable non-transitory recording medium storing a program, which, when run by a computer, causes the computer to execute the method according to claim 13.

15. A method of manufacturing a product by using a robot, the robot including:

an end effector configured to hold a first workpiece, and
a robot arm configured to move the end effector and cause the first workpiece to contact a second workpiece, the robot arm including:
a first driving source,
a second driving source, and
an output portion to which both rotation of the first driving source and rotation of the second driving source are transmitted, the method comprising:

executing, by a control device, a first process and a second process depending on a motion of the robot to be performed, wherein, in the first process, the control device controls the first driving source and the second driving source such that when the output portion is rotated in a predetermined direction, a rotational direction of the output portion is limited to the predetermined direction, for positioning the end effector at a predetermined position via the output portion and causing the end effector to hold the first workpiece, wherein, in the second process, the control device controls the first driving source and the second driving source such that when the output portion is rotated in the predetermined direction, the output portion is able to rotate in a direction opposite to the predetermined direction, for moving the end effector via the output portion and causing the first workpiece to contact the second workpiece to manufacture the product, wherein, in a case where the second process is executed to control the end effector via the output portion to move the first workpiece, the control device controls the first driving source and the second driving source such that a first torque generated by the first driving source and a second torque generated by the second driving source are made different and a difference is generated between the first torque and the second torque, and wherein, in a case where the second process is executed to control the end effector via the output portion to cause the first workpiece to contact the second workpiece, the control device controls the first driving source and the second driving source such that the first torque generated by the first driving source and the second torque generated by the second driving source are controlled such that the difference between the first torque and the second torque is less than the difference between the first torque and the second torque in the case where the second process is executed to control the end effector via the output portion to move the first workpiece.

16. A driving device for driving a robot, the robot comprising:
    an end effector configured to hold a first workpiece, and
    a robot arm including the driving device and configured to move the end effector and cause the first workpiece to contact a second workpiece, the driving device including:
        a first driving source,
        a second driving source,
        an output portion to which both rotation of the first driving source and rotation of the second driving source are transmitted, and
        a control device configured to execute a first process and a second process,
    wherein in the first process, the control device controls the first driving source and the second driving source such that when the output portion is rotated toward a predetermined direction, a rotational direction of the output portion is limited to the predetermined direction,
    wherein in the second process, the control device controls the first driving source and the second driving source such that when the output portion is rotated toward the predetermined direction, the output portion is able to rotate toward a direction opposite to the predetermined direction,
    wherein, in a case where the second process is executed to control the end effector via the output portion to move the first workpiece, the control device controls the first driving source and the second driving source such that a first torque generated by the first driving source and a second torque generated by the second driving source are made different and a difference is generated between the first torque and the second torque, and wherein, in a case where the second process is executed to control the end effector via the output portion to cause the first workpiece to contact the second workpiece, the control device controls the first driving source and the second driving source such that the first torque generated by the first driving source and the second torque generated by the second driving source are controlled such that the difference between the first torque and the second torque is less than the difference between the first torque and the second torque in the case where the second process is executed to control the end effector via the output portion to move the first workpiece.

17. A control method of a driving device for driving a robot that includes an end effector configured to hold a first workpiece, and a robot arm including the driving device and configured to move the end effector and cause the first workpiece to contact a second workpiece, the driving device including:
    a first driving source,
    a second driving source, and
    an output portion to which both rotation of the first driving source and rotation of the second driving source are transmitted,
    the method comprising:
    executing, by a control device, a first process and a second process depending on a motion of the robot to be performed,
    wherein, in the first process, the control device controls the first driving source and the second driving source such that when the output portion is rotated in a predetermined direction, a rotational direction of the output portion is limited to the predetermined direction, for positioning the end effector at a predetermined position via the output portion and causing the end effector to hold the first workpiece,
    wherein, in the second process, the control device controls the first driving source and the second driving source such that when the output portion is rotated in the predetermined direction, the output portion is able to rotate in a direction opposite to the predetermined direction, for moving the end effector via the output portion and causing the first workpiece to contact the second workpiece to manufacture a product,
    wherein, in a case where the second process is executed to control the end effector via the output portion to move the first workpiece, the control device controls the first driving source and the second driving source such that a first torque generated by the first driving source and a second torque generated by the second driving source are made different and a difference is generated between the first torque and the second torque, and
    wherein, in a case where the second process is executed to control the end effector via the output portion to cause the first workpiece to contact the second workpiece, the control device controls the first driving source and the second driving source such that the first torque generated by the first driving source and the second torque generated by the second driving source are controlled such that the difference between the first torque and the second torque is less than the difference between the first torque and the second torque in the case where the second process is executed to control the end effector via the output portion to move the first workpiece.

* * * * *